US010146659B2

(12) United States Patent
Putra et al.

(10) Patent No.: US 10,146,659 B2
(45) Date of Patent: Dec. 4, 2018

(54) LARGE EVENT LOG REPLAY METHOD AND SYSTEM (71) Applicant: Pusan National University Industry-University Cooperation Foundation, Busan (KR)

(72) Inventors: Ahmad Dzulfikar Adi Putra, Busan (KR); Hye Rim Bae, Busan (KR); Iq Reviessay Pulshashi, Busan (KR); Riska Asriana Sutrisnowati, Busan (KR); Prastyabudi Wahyu Andy, Busan (KR); Yu Lim Choi, Busan (KR)

(73) Assignee: PUSAN NATIONAL UNIVERSITY INDUSTRY-UNIVERSITY COOPERATION FOUNDATION, Busan (KR)

(*) Notice: Subject to any disclaimer, the term of this patent is extended or adjusted under 35 U.S.C. 154(b) by 0 days.

(21) Appl. No.: 15/947,734

(22) Filed: Apr. 6, 2018

(65) Prior Publication Data
US 2018/0225189 A1    Aug. 9, 2018

Related U.S. Application Data (63) Continuation of application No. PCT/KR2017/013633, filed on Nov. 28, 2017.

(51) Int. Cl.
*G06F 17/30* (2006.01)
*G06F 11/34* (2006.01)
(Continued)

(52) U.S. Cl.
CPC .......... *G06F 11/3476* (2013.01); *G06F 9/542* (2013.01); *G06F 9/547* (2013.01);
(Continued)

(58) Field of Classification Search
CPC .. G06F 11/3476; G06F 11/1471; G06F 9/542; G06F 9/547; G06F 17/30185; G06F 2201/86; G06F 17/30144; G06F 17/30991
(Continued)

(56) References Cited

U.S. PATENT DOCUMENTS 9,734,021 B1\* 8/2017 Sanocki .............. G06F 11/1469
2010/0088354 A1\* 4/2010 Wu ...................... G06F 11/3409
707/827
(Continued)

FOREIGN PATENT DOCUMENTS

JP       2003033958 A    2/2003
KR       100528001 B1   11/2005
(Continued)

OTHER PUBLICATIONS

Turner, "Divide and Conquer Meag-Sized Text and Log Files", Published on ITProToday, Feb. 2009 (Year: 2009).\*
(Continued)

*Primary Examiner* — David T. Brooks
(74) *Attorney, Agent, or Firm* — Cantor Colburn LLP (57) ABSTRACT A large event log replay method and system are provided. The large event log replay method includes counting event logs generated in a process before a next process performed subsequent to the process and maintaining a log file that records the event logs in a storage system, verifying a log file corresponding to a process included in an access command for a log replay page from the storage system in response to the access command being generated, and generating a plurality of split log files by dividing the verified log file into a set size and acquiring the plurality of split log files from the storage system.

18 Claims, 10 Drawing Sheets

(51) Int. Cl.
*G06F 11/14* (2006.01)
*G06F 9/54* (2006.01)
*G06F 7/00* (2006.01)

(52) U.S. Cl.
CPC .......... *G06F 11/1471* (2013.01); *G06F 17/30* (2013.01); *G06F 17/30144* (2013.01); *G06F 17/30185* (2013.01); *G06F 17/30991* (2013.01); *G06F 2201/86* (2013.01)

(58) Field of Classification Search
USPC ................................ 707/682, 648, 672, 822
See application file for complete search history.

(56) References Cited

U.S. PATENT DOCUMENTS

| | | | | |
|---|---|---|---|---|
| 2011/0072058 | A1* | 3/2011 | Tang | G06F 9/5055 707/823 |
| 2013/0117236 | A1* | 5/2013 | Schreter | G06F 17/30356 707/682 |
| 2013/0173558 | A1* | 7/2013 | Whisenant | G06F 11/0793 707/674 |
| 2014/0025995 | A1* | 1/2014 | Narayanan | G06F 11/0706 714/37 |
| 2014/0143070 | A1* | 5/2014 | DeVree | G06Q 30/02 705/14.73 |
| 2014/0281131 | A1* | 9/2014 | Joshi | G06F 12/0804 711/103 |
| 2015/0019909 | A1* | 1/2015 | Griffith | G06F 11/1458 714/15 |
| 2015/0154288 | A1* | 6/2015 | Kim et al. | G06F 17/30705 707/737 |

FOREIGN PATENT DOCUMENTS

| | | |
|---|---|---|
| KR | 1020070015871 A | 2/2007 |
| KR | 1020100027836 A | 3/2010 |
| KR | 101218338 B1 | 1/2013 |
| KR | 101341441 B1 | 12/2013 |
| KR | 1020150063233 A | 6/2015 |
| KR | 101556541 B1 | 10/2015 |

OTHER PUBLICATIONS

International Search Report dated Mar. 5, 2018 for PCT/KR2017/013633, citing the above references.

* cited by examiner

(i) Event log[4]

| W = (E, ET, A, R, C, t, et, a, r, c) |
|---|

(ii)

| CID | Event ID | Timestamp | Activity | Resource | Costs |
|---|---|---|---|---|---|
| 1 | 35654423 | 30-12-2010:11.02 | register request | Pete | 50 |
| 1 | 35654424 | 31-12-2010:10.06 | examine thoroughly | Sue | 400 |
| 1 | 35654425 | 05-01-2011:15.12 | check ticket | Mike | 100 |
| 1 | 35654426 | 06-01-2011:11.18 | decide | Sara | 200 |
| 1 | 35654427 | 07-01-2011:14.24 | reject request | Pete | 200 |
| 2 | 35654483 | 30-12-2010:11.32 | register request | Mike | 50 |
| 2 | 35654485 | 30-12-2010:12.12 | check ticket | Mike | 100 |
| 2 | 35654487 | 30-12-2010:14.16 | examine casually | Sean | 400 |
| 2 | 35654488 | 05-01-2011:11.22 | decide | Sara | 200 |
| 2 | 35654489 | 08-01-2011:12.05 | pay compensation | Ellen | 200 |
| ... | ... | ... | ... | ... | ... |
| 6 | 35654871 | 06-01-2011:15.02 | register request | Mike | 50 |

FIG. 4

(i) Process model $G = (N, E, na)$

LARGE EVENT LOG REPLAY METHOD AND SYSTEM

CROSS-REFERENCE TO RELATED APPLICATION(S)

This application is a continuation of PCT International Patent Application No. PCT/KR2017/013633, filed on Nov. 28, 2017, claiming priority based on Korean Patent Applications No. 10-2016-0177345 filed on Dec. 23, 2016, the contents of which are incorporated herein by reference in their entirety.

BACKGROUND

1. Field of the Invention

One or more example embodiments relate to a technology to reduce an amount of time for processing of an event log in a log replay process of replaying an event log used in a process mining.

2. Description of the Related Art

A log replay is a technology of visualizing and replaying an event log record using a process model, and is being used in a process mining field that extracts a knowledge from event logs recorded in a log file in response to a process execution.

In a log replay technology according to a related art, when large event logs are generated in response to a process execution, deviation and bottleneck issues may occur in a process of processing event logs, generating a token animation and calculating a real KPI (Key Performance Index).

Thus, there is a desire for a technology to solve deviation and bottleneck issues occurring in a log replay process and to improve an operation processing speed.

SUMMARY

An aspect is to improve a processing speed for replaying an event log and to solve deviation and bottleneck problems by dividing a large event log into small partitions based on a distributed application program interface (API) web service using a MapReduce algorithm.

According to an aspect, there is provided a large event log replay method including counting event logs generated in a process before a next process performed subsequent to the process and maintaining a log file that records the event logs in a storage system, verifying a log file corresponding to a process included in an access command for a log replay page from the storage system in response to the access command being generated, and generating a plurality of split log files by dividing the verified log file into a set size, and acquiring the plurality of split log files from the storage system.

According to another aspect, there is provided a large event log replay system including a recorder configured to count event logs generated in a process before a next process performed subsequent to the process and to maintain a log file that records the event logs in a storage system, a verifier configured to verify a log file corresponding to a process included in an access command for a log replay page from the storage system in response to the access command being generated, and an acquirer configured to generate a plurality of split log files by dividing the verified log file into a set size and to acquire the plurality of split log files from the storage system.

Additional aspects of example embodiments will be set forth in part in the description which follows and, in part, will be apparent from the description, or may be learned by practice of the disclosure.

Effect of the Invention

According to example embodiments, it is possible to improve a processing speed for replaying an event log and to solve deviation and bottleneck problems by dividing a large event log into small partitions based on a distributed application program interface (API) web service using a MapReduce algorithm, in a log replay process of replaying an event log.

Also, according to example embodiment, it is possible to enhance a log replay processing performance through a division and a distribution processing of a large event log by dividing the large event log, generating an animation in a form of a distributed API web service, calculating a real KPI, and sequentially replaying the divided event log in a client web application.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, an application program updating apparatus and method according to an example embodiment will be described in detail with reference to the accompanying drawings. The scope of the right, however, should not be construed as limited to the example embodiments set forth herein. Like reference numerals in the drawings refer to like elements throughout the present disclosure.

Figure 1:
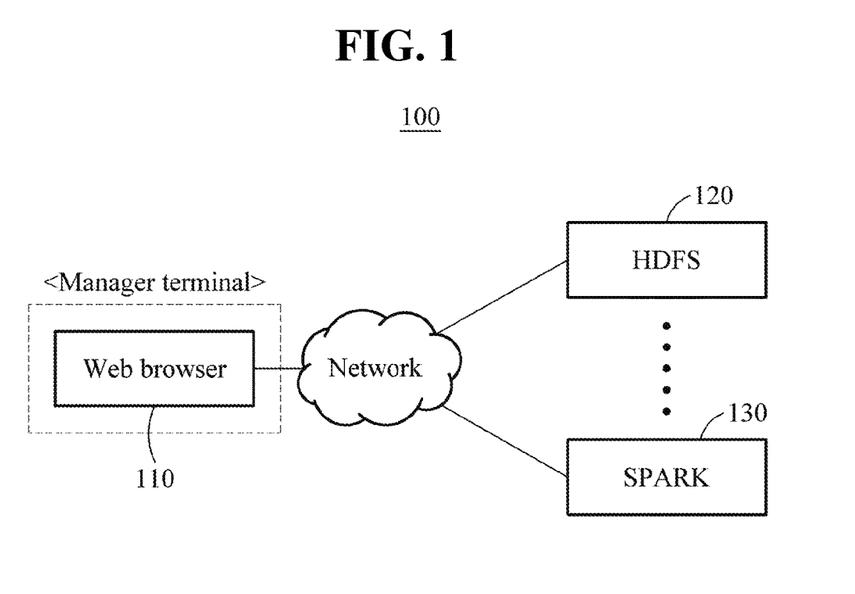
FIG. 1 is a diagram illustrating a configuration of a large event log replay system according to an example embodiment.

FIG. 1 is a diagram illustrating a configuration of a large event log replay system according to an example embodiment.

Referring to FIG. 1, a large event log replay system 100 according to an example embodiment may include a web browser 110, a Hadoop file system (HDFS) 120 and a SPARK 130.

The web browser 110 may be one of web applications executed in a manager terminal, and may include, for example, a Google Chrome.

In response to a generation of an access command for a log replay page in the manager terminal, the web browser 110 may verify a log file corresponding to a process included in the access command from the HDFS 120, and may sequentially acquire a plurality of split log files into which the verified log file is divided in a set size from the HDFS 120.

The web browser 110 may process a predetermined number of event logs included in each of the plurality of split log files based on a representational state transfer application program interface (REST API), and may implement a log replay page representing an event occurrence degree for each process in the manager terminal.

In other words, the web browser 110 may process each of the plurality of split log files based on the REST API, and may visualize and implement the log replay page by stages.

Depending on example embodiments, when a log file associated with the access command is not maintained in the HDFS 120, the web browser 110 may wait for a generation of an event log in response to a process execution in the SPARK 130.

The SPARK 130 may count event logs that are generated in a process before a next process performed subsequent to the process, and may maintain a log file that records the event logs in the HDFS 120.

The SPARK 130 may be an example of a general-purpose high-performance partition processing platform, and may perform a function of distributing and processing data by partitioning a process based on a memory based on a MapReduce function.

In the present disclosure, MapReduce has been formed to process massive data in a distributed parallel computing, is a software framework published in 2004, and may include MAP and REDUCE functions commonly used in functional programming.

Thus, the large event log replay system 100 ma divide a large event log into small partitions in a log replay process of replaying an event log, to improve a processing speed for replaying an event log.

The REST API may provide a unidirectional interoperability between computing systems in the Internet, and may refer to one of web service APIs that permit a requests to access systems or that control a text representation of a web resource.

The HDFS 120 may be one of storage systems configured to distribute and process a large quantity of data, and may divide and store a large file, to facilitate data processing.

Figure 2:
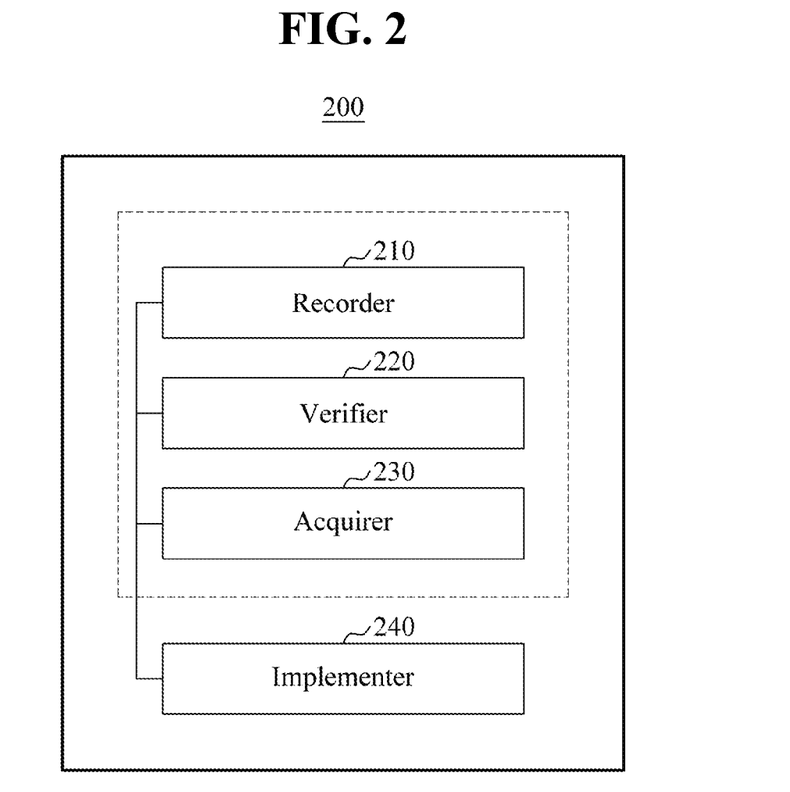
FIG. 2 is a block diagram illustrating an internal configuration of a large event log replay system according to an example embodiment.

FIG. 2 is a block diagram illustrating an internal configuration of a large event log replay system according to an example embodiment.

Referring to FIG. 2, a large event log replay system 200 according to an example embodiment may include a recorder 210, a verifier 220, an acquirer 230 and an implementer 240.

The recorder 210 may count event logs that are generated in a process before a next process performed subsequent to the process, and may maintain a log file that records the event logs in a storage system.

For example, the recorder 210 may record event logs that are generated for various task actions during a process execution by a partition processing platform (for example, a SPARK), as a log file in an order that the event logs are generated.

The recorder 210 may distribute and store the log file in the storage system (for example, an HDFS) that is configured to distribute and process a large quantity of data, to further facilitate processing of large event logs during a log replay.

Figure 5A:
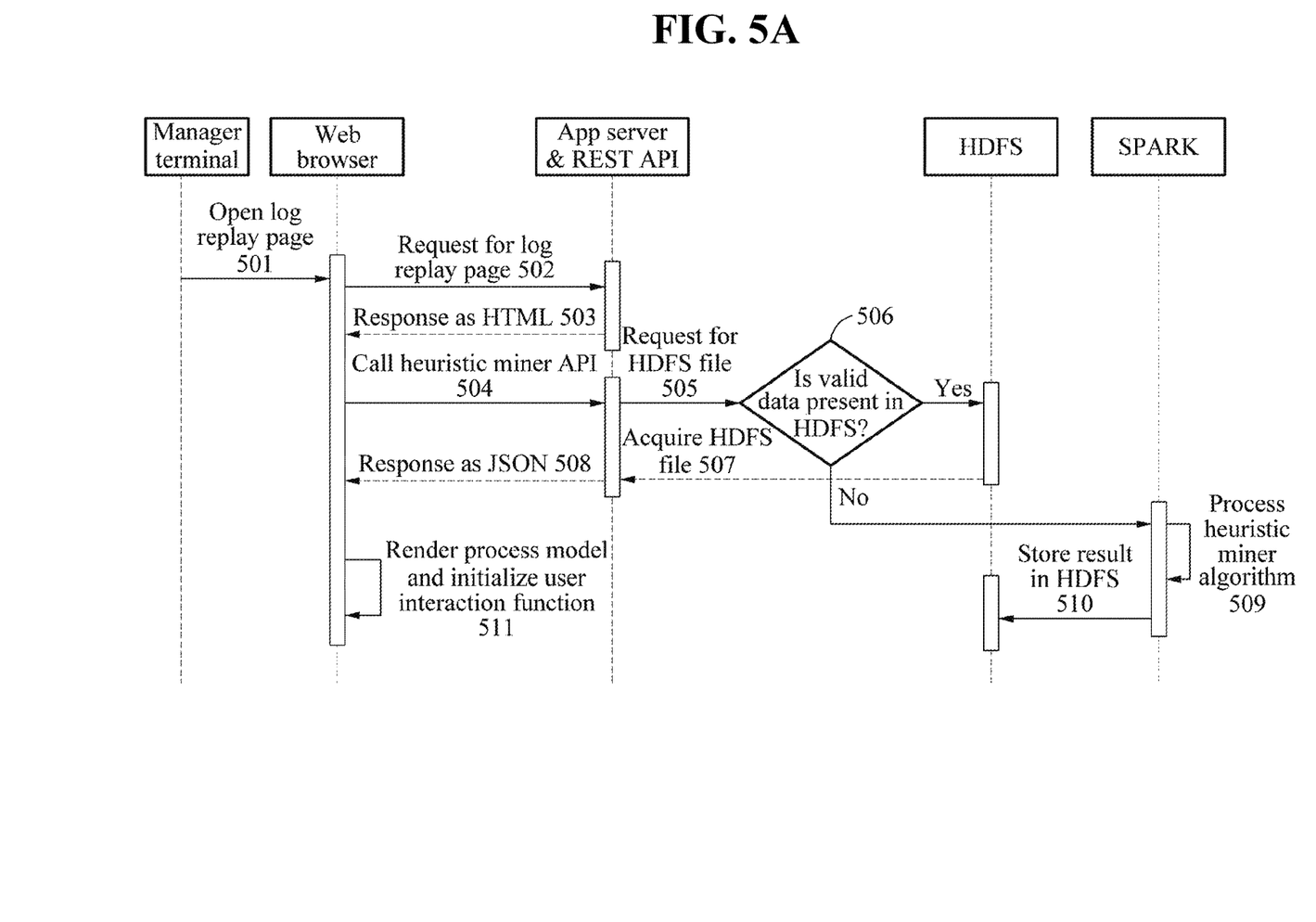
FIGS. 5A and 5B are flowcharts illustrating a series of processes of providing a log replay page in a large event log replay system according to an example embodiment.
Figure 5B:
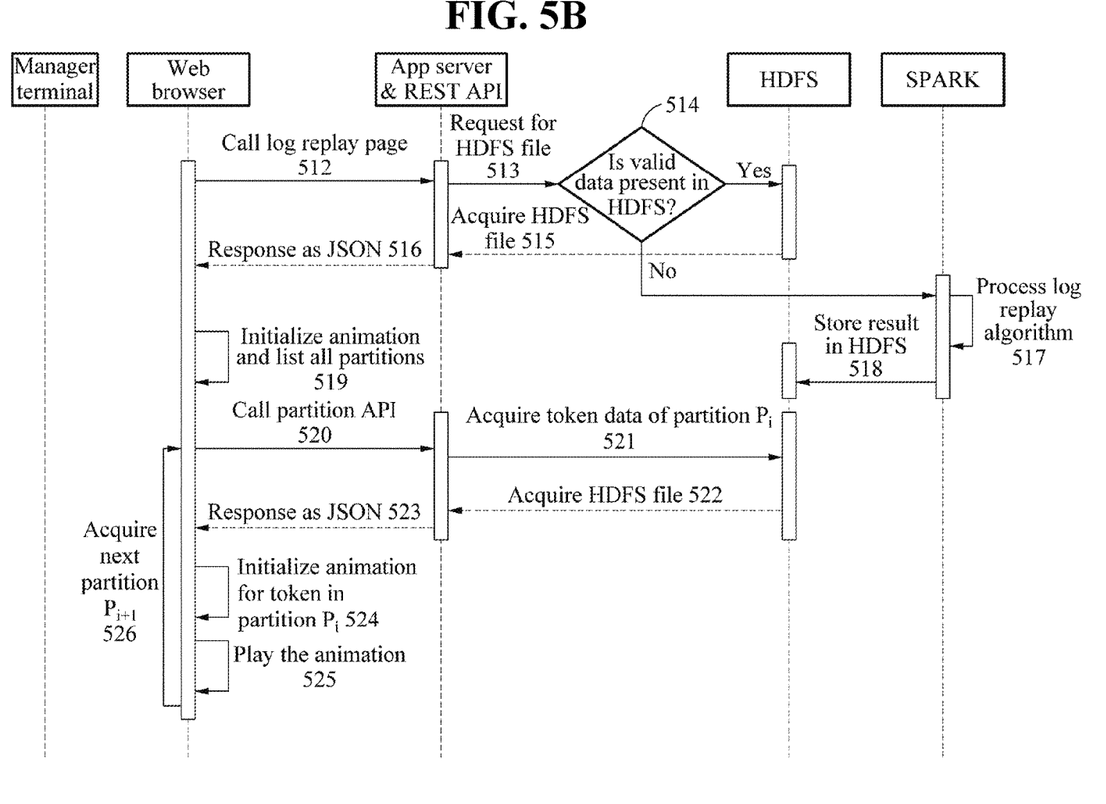

For example, referring to FIGS. 5A and 5B, the recorder 210 may process a process based on a log replay algorithm, and may be implemented by a SPARK that maintains a processing result in an HDFS.

An event log may be a set of events (for example, a start, an end and a cancellation of a task) that are unit tasks of a process, may be associated with a single case, may include a variety of additional information and may be recorded as a log file so as to show information about who, when, where and what task is performed.

For example, an event log may include a variety of additional information about at least one of an activity of an event and data (for example, a scale of an order) associated with an event, a timestamp of an event (that is, an event occurrence time) and a resource (for example, a task performer, a system, equipment, and the like) that starts or performs a task. The activity may be a basic unit of a process and may be information indicating an execution of a task.

The verifier 220 may verify a log file corresponding to a process included in an access command for a log replay page representing a degree of a generation of event logs during the process from the storage system, in response to the access command being generated.

The verifier 220 may be implemented by a web browser (for example, a Google Chrome) executed in a manager terminal that generates the access command.

When a log file associated with the access command is not maintained in the storage system (for example, an HDFS), the verifier 220 may wait for a generation of an event log in response to a process execution in a partition processing platform (for example, a SPARK).

For example, when a log file associated with the access command is not maintained in the storage system, and when a log file that records an event log generated in response to processing of a process in the partition processing platform is maintained in the storage system, the acquirer 230 may acquire the generated log file from the storage system.

For example, referring to operations 514 through 518 of FIG. 5B, when valid data is determined to be absent in an HDFS, the partition processing platform (for example, a SPARK) may store a result of processing a process based on a log replay algorithm in the HDFS, and the HDFS may return a stored HDFS file to an app server & REST API and may send a response as a JavaScript object notation (JSON) to a web browser.

Figure 6:
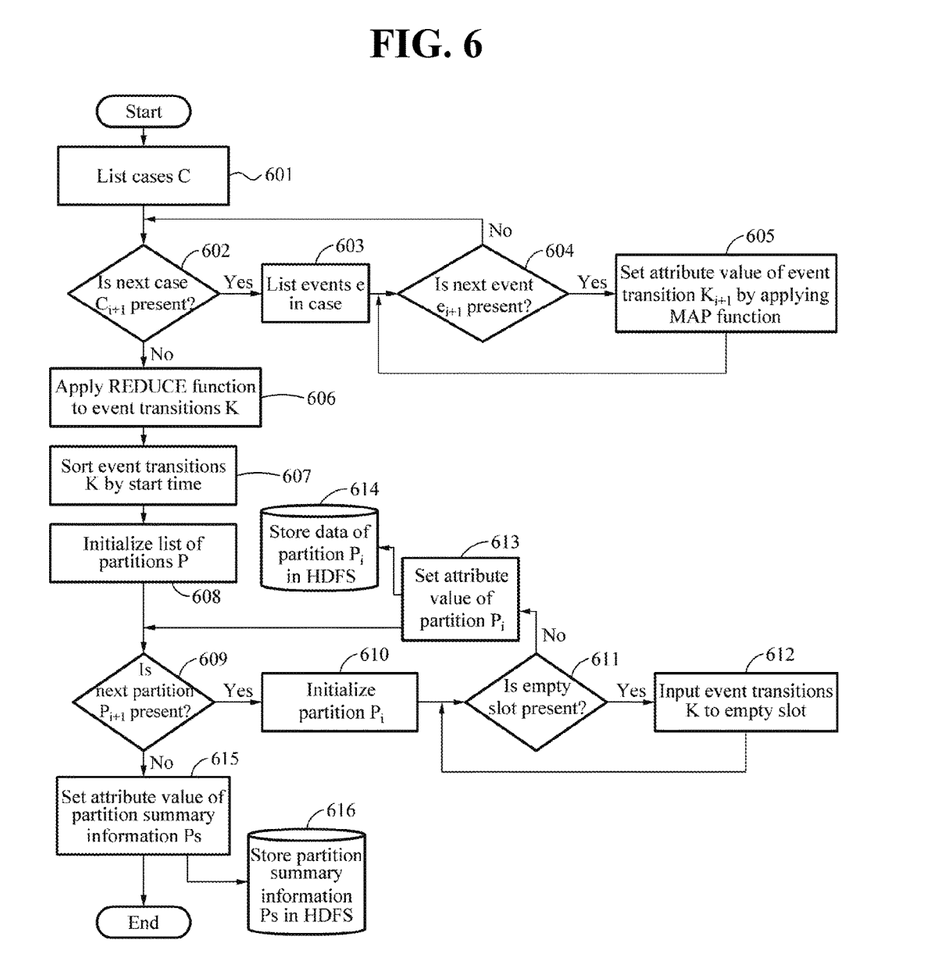
FIG. 6 is a flowchart illustrating, in detail, an example of operation 517 of FIG. 5B.

Referring to FIG. 6, when a list of cases including a sequence of event logs is input, the partition processing platform (SPARK) may map all event logs in the cases to event transitions using a MAP function, may apply a REDUCE function to the event transitions, may sort the event transitions using a SORT function based on points in time at which the event transitions are generated, may initialize a partition, may insert a predetermined number (for example, "5,000") of event transitions into each of the partitions using an INSERT function, may maintain each of the partitions in the storage system, and may maintain summary information of each of the partitions in the storage system.

The acquirer 230 may generate a plurality of split log files by dividing the verified log file into a set size (partitions), and may acquire the plurality of split log files from the storage system (for example, an HDFS).

For example, the acquirer 230 may transmit a division command to the storage system, and the storage system may generate the plurality of split log files by dividing the log file into partitions based on the division command.

For example, when a list of cases including a sequence of event logs is input, the acquirer 230 may map event logs in the cases to event transitions using a MAP function, and may apply a REDUCE function to the event transitions.

The acquirer 230 may sort the event transitions using a SORT function based on points in time at which the event transitions are generated, may insert a predetermined number of event transitions into each of the partitions using an INSERT function in a state in which a partition is initialized, and may generate the plurality of split log files.

In this example, the acquirer 230 may determine a size of a split log file based on a type of the process or a capacity of the log file and may adjust an acquisition interval of each of the split log files from the storage system in proportion to the determined size.

The storage system may divide the log file based on at least one of a number of event logs per partition and a number of partitions. The number of event logs and the number of partitions may be designated by the division command.

For example, the acquirer 230 may sequentially acquire the plurality of split log files based on an order in which the plurality of split log files are located in the log file. For example, the acquirer 230 may sequentially acquire, from the HDFS, a plurality of split log files generated by dividing the log file verified from the HDFS into partitions.

Also, the event logs may be recorded in the log file in correspondence to points in time at which the event logs are generated. When a predetermined number of event logs included in a first split log file among the plurality of split log files are being processed, the acquirer 230 may acquire a second split log file that is located next to the first split log file in the log file from the storage system.

In addition, the acquirer 230 may transmit a division command to the storage system and may acquire a specific split log file identified by a token included in the division command from the storage system.

The implementer 240 may implement a log replay page representing an event occurrence degree for each process, through rendering of a predetermined number of event logs included in each of the plurality of split log files.

In an example, the acquirer 230 may generate a plurality of split log files by dividing all event logs included in the log file by "n" that is a natural number greater than or equal to "2." The implementer 240 may render a predetermined number of event logs included in each of the plurality of generated split log files, and may implement the log replay page.

In another example, the acquirer 230 may sequentially divide all the event logs in the log file by a selected number and generate a plurality of split log files. The implementer 240 may render an event log included in each of the plurality of split log files at a point in time at which each of the plurality of split log files is generated, and may visualize and implement the log replay page, through a REST API-based web application, for example, a web browser.

In this example, the implementer 240 may display activities included in the event logs as nodes, and may implement a log replay page representing a processing flow of the process and a degree of a generation of an event log during the process, based on a size of a figure that moves along an arc connecting nodes.

Figure 8:
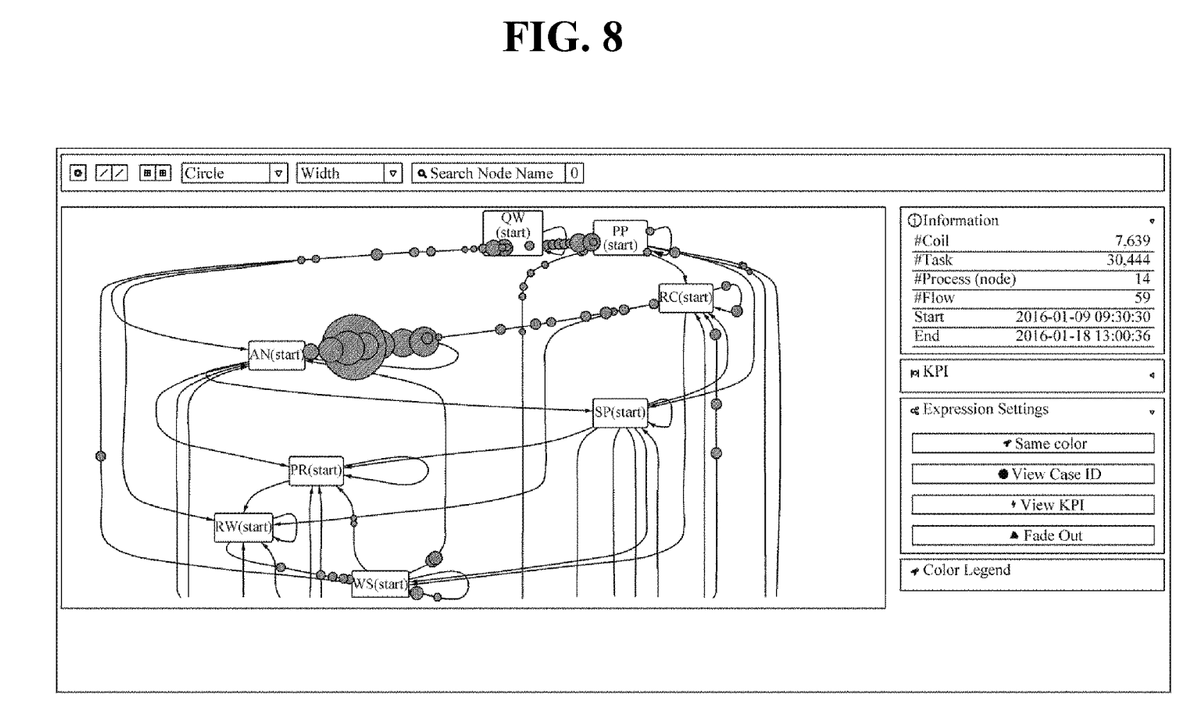
FIG. 8 is a diagram illustrating an example of visualizing a log replay page in a large event log replay system according to an example embodiment.

For example, referring to FIG. 8, the implementer 240 may display, as nodes, activities QW, PP, RC, SP, AN, PR, RW and WS included in an event log, may connect the nodes by an arc, may express a flow of a process using a figure (for example, a circle) moving between the nodes along the arc, and may show a quantity of the flow of the process based on a size of the figure, to visualize a log replay page in a manager terminal.

Depending on example embodiments, the recorder 210 may associate the log file with partition summary information including a partition attribute value set for each of the plurality of split log files and may maintain the log file in the storage system, in conjunction with a generation of the plurality of split log files. The partition attribute value may include, for example, at least one of a number of event logs included in a partition, a sort order of partitions and a number of empty slots limited per partition. The implementer 240 may quickly process each of the plurality of split log files using a partition attribute value read from the partition summary information, and may implement the log replay page.

For example, the implementer 240 may sequentially identify a plurality of split log files or may quickly identify and process a portion of the split log files by utilizing partition summary information provided during a generation of the plurality of split log files, and thus it is possible to more easily replay a large event log in the manager terminal.

Also, depending on example embodiments, the acquirer 230 may predict a remaining processing time for each of cases associated with a sequence of the event logs based on at least one of a frequency and an event occurrence time verified from a timestamp included in each of the event logs, may select a first case in which the remaining processing time is predicted to be greater than a reference time interval, and may derive a node (for example, a first activity) associated with the first case as a bottleneck point of the process.

The acquirer 230 may divide all event logs included in the log file based on the first case, and generate the plurality of split log files. The implementer 240 may sequentially render event logs included in each of the plurality of split log files, may visualize the log replay page and may prevent the bottleneck point from being displayed on the log replay page.

The implementer 240 may quickly implement a log replay of an overall process by disconnecting an event log in which a bottleneck phenomenon is likely to occur as a split point.

In addition, depending on example embodiments, when a visualization command for the log replay page is generated before all the plurality of generated split log files are acquired in the acquirer 230, the implementer 240 may visualize the log replay page using a portion of the split log files that are acquired from the storage system before the visualization command is generated, and may update the log replay page by generating the visualization command again at a point in time at which the remaining split log files are acquired from the storage system.

As described above, according to an example embodiment, a large event log may be automatically distributed and processed in a unit of a partition based on a log replay command, and thus it is possible to replay an event log regardless of a size of the event log so that a bottleneck phenomenon is prevented. Also, it is possible to lightly and quickly visualize a log replay page using a general web application that is easily accessible by a manager terminal.

Figure 3:
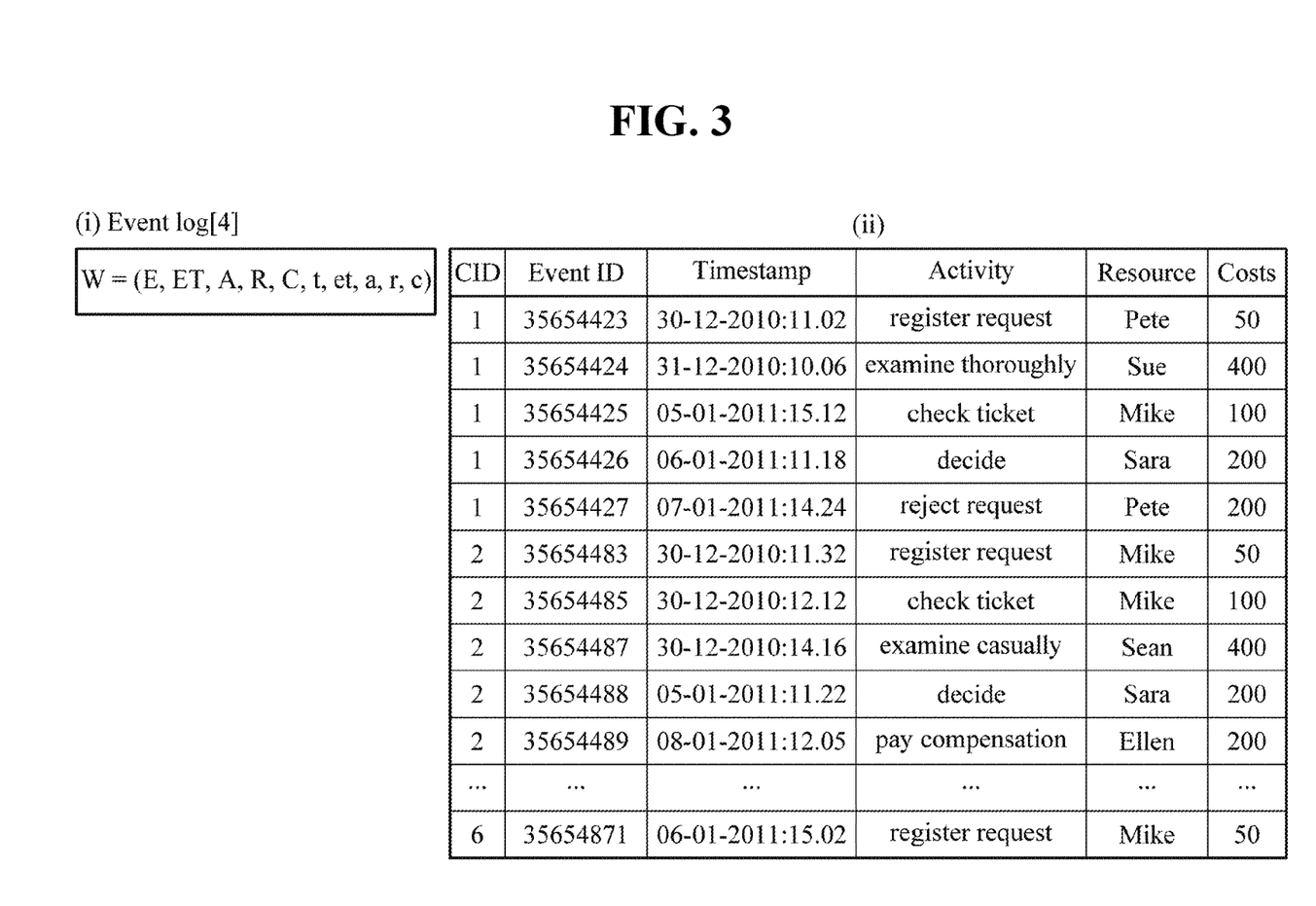
FIG. 3 is a diagram illustrating an example of a log file and an event log in a large event log replay system according to an example embodiment.

FIG. 3 is a diagram illustrating an example of a log file and a configuration of an event log in a large event log replay system according to an example embodiment.

In the present disclosure, an event log may refer to a set of events used as an input for process mining, and an event may be a unit task of a process and may refer to an action recorded in a log file, for example, a start, an end and a cancellation of a task.

The process mining may be a technique of extracting a knowledge by analyzing an event log (transaction dataset) generated in a machine or an information-related system.

Events (event log) may be associated with a single case. A case may be a sequence of events and may refer to a process instance that corresponds to individuals processed by a process that is to be analyzed.

An event log may include a variety of additional information that may be utilized in a process mining technique, for each event.

For example, an event log may include a variety of additional information about at least one of an activity of an event and data (for example, a scale of an order) associated with an event, a timestamp of an event (that is, an event occurrence time) and a resource (for example, a task performer, a system, equipment, and the like) that starts or performs a task, so as to show information about who, when, where and what task is performed. The activity may be a basic unit of a process and may be information indicating an execution of a task.

In FIG. 3, (i) shows an example of a configuration of an event log W[4].

Referring to (i) of FIG. 3, the event log W[4] may include a set "E" of events "e", a set "ET" of event types "et", a set "A" of activities "a", a set "R" of resources "r", a set "C" of cases "c", a function "t:E→$iR_0^+$" that assigns a timestamp to each event, a function "et:E→ET" that assigns an event type to each event, a function "a:E→EA" that associates each event with an activity, a function "r:E→R∪{⊥}" that associates each event with a resource, and a function "c:E→C" that associates each event with a case.

Event logs may occur for various task actions during a process execution and may be recorded in a log file in an order that the event logs are generated.

In (ii) of FIG. 3, a table shows an example of a log file in which an event log is recorded.

Referring to (ii) of FIG. 3, an event log may associate each event with additional information about at least one of an event identification (ID), a timestamp (that is, an event occurrence time), an activity (that is, a task of an event), a resource (for example, a task performer, a system, equipment, and the like) and costs, to be recorded in a log file.

The event log (events) may be recorded in log files scattered across different databases, instead of in a single log file.

Figure 4:
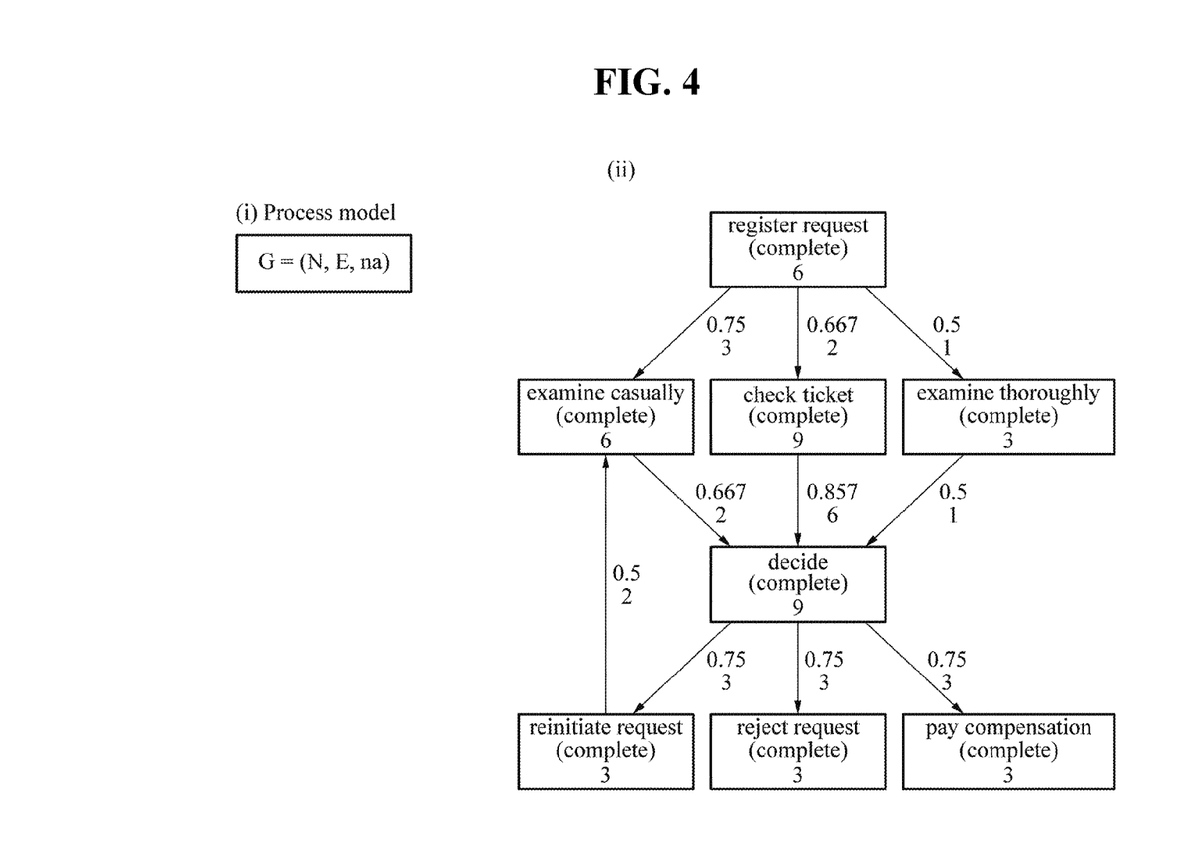
FIG. 4 is a diagram illustrating an example of a process model generated from an event log in a large event log replay system according to an example embodiment.

FIG. 4 is a diagram illustrating an example of a process model generated from an event log in a large event log replay system according to an example embodiment.

The large event log replay system may generate a process model through an analysis of an event log based on a process mining technique.

For example, the large event log replay system may analyze features of all available paths by focusing on a flow of a process, such as a sequence of tasks, and may derive, for example, a Petri net model or a process model, such as, EPC, BPMN and UML activity diagram.

Also, the large event log replay system may analyze which performers (for example, workers, systems, roles or departments) are involved in a work and how the performers are connected, by focusing on information about a resource hidden in an event log, to form an organizational structure by classifying people by roles or functions or to derive a process model showing a social network between people.

In addition, the large event log replay system may derive a process model by focusing on a feature of a case. For example, the large event log replay system may analyze a feature of a case based on a path in a process or a worker partitioning in the case, or based on a value of data associated with the case. For example, when a case indicating a supplemental order exists, a quantity and a supplier of an ordered product may be useful information.

Furthermore, the large event log replay system may analyze a frequency and a time of an event based on a timestamp included in an event log, and may derive a process model. For example, the large event log replay system may derive a bottleneck point, may measure a level of a service, may monitor a resource utilization and may predict a remaining time of a case that is being performed.

In FIG. 4, (i) shows an example of a configuration of a process model G.

Referring to (i) of FIG. 4, the process model G may include a set N of nodes, a set "E□N×N" of arcs linking the nodes, and a function "na:N→P(A)" that associates a single node with a set of activities.

In FIG. 4, (ii) shows a graph of a process model derived based on the log file shown in (ii) of FIG. 3.

Referring to (ii) of FIG. 4, the large event log replay system may generate, as nodes, activities shown in (ii) of FIG. 3 (for example, "register request", "examine thoroughly", "check ticket", "decide", "reject request", "examine casually", and "pay compensation"), and may connect the nodes by arcs, to derive the graph of the process model.

FIGS. 5A and 5B are flowcharts illustrating a series of processes of providing a log replay page in a large event log replay system according to an example embodiment.

Referring to FIG. 5A, in operations 501 and 502, when an open command for a log replay page is received from a manager terminal, a web browser sends a request for the log replay page to an app server and REST API.

In operations 503 through 505, when a response as a hypertext markup language (HTML) is received from the app server & REST API, the web browser calls a heuristic miner API and sends a request for an HDFS log file.

In operation 506, the HDFS determines whether valid data is present in the HDFS, when the request for the HDFS file is received.

When the valid data is determined to be present in the HDFS in operation 506, the HDFS returns the HDFS file to the app server & REST API in operation 507, and the app server & REST API sends a response as a JSON to the web browser in operation 508.

When the valid data is determined to be absent in the HDFS in operation 506, a SPARK processes a process based on a heuristic miner algorithm in operation 509 and stores a processing result (log file) in the HDFS in operation 510. The HDFS returns the stored HDFS file to the app server & REST API in operation 507, and the app server & REST API sends a response as a JSON to the web browser in operation 508.

The JSON may be a lightweight data exchange format, may be easily read and written by a human, may be easily parsed and generated by a machine, and may be based on a subset of JavaScript.

In operation 511, the web browser renders a process model and initializes a user interaction function.

Referring to FIG. 5B, in operations 512 and 513, the web browser calls a log replay page and sends a request for an HDFS file.

In operation 514, the HDFS determines whether valid data is present in the HDFS, when the request for the HDFS file is received.

When the valid data is determined to be present in the HDFS in operation 514, the HDFS returns the HDFS file to the app server & REST API in operation 515, and the app server & REST API sends a response as a JSON to the web browser in operation 516.

When the valid data is determined to be absent in the HDFS in operation 514, the SPARK processes a process based on a log replay algorithm in operation 517 and stores a processing result (log file) in the HDFS in operation 518. The HDFS returns the stored HDFS file to the app server & REST API in operation 515, and the app server & REST API sends a response as a JSON to the web browser in operation 516.

In operation 519, the web browser initializes an animation and lists all partitions.

For example, the web browser initializes a parent timeline tmp, for handling of the animation.

In operations 520 and 521, the web browser calls a partition API and acquires token data of a partition $P_i$. In operation 522, the HDFS returns the HDFS file to the app server & REST API based on the token data. In operation 523, the app server & REST API sends a response as a JSON to the web browser.

In operations 524 through 526, the web browser initializes an animation for a token in the partition $P_i$, plays the animation, and acquires a next partition $P_{i+1}$.

FIG. 6 is a flowchart illustrating, in detail, an example of operation 517 of FIG. 5B.

FIG. 6 illustrates, in detail, a process by which a SPARK processes a process based on a log replay algorithm and stores a processing result in an HDFS.

Referring to FIG. 6, in operation 601, the SPARK retrieves a list of cases C from a system.

The SPARK starts mapping of a list of event transitions K in an event log E. The list of the cases C may be retrieved from the system, and each case $C_i$ may include a sequence of events e.

In operation 602, the SPARK determines whether a next case $C_{i+1}$ is present.

When the next case $C_{i+1}$ is determined to be present in operation 602, the SPARK lists the events e in the case in operation 603.

In operations 602 and 603, the SPARK iterates each case C, to inspect the sequence of the events e.

In operation 604, the SPARK determines whether a next event $e_{i+1}$ is present.

When the next event $e_{i+1}$ is determined to be present in operation 604, the SPARK sets an attribute value of an event transition $K_{i+1}$ by applying a MAP function in operation 605. For example, an event transition may indicate a change between two consecutive events.

In operations 604 and 605, the SPARK iterates a sequence of an event $e_{ij}$ in a case $C_i$ to set an attribute of an event transition $K_{ij}$.

When the next event $e_{i+1}$ is determined to be absent in operation 604, the SPARK redetermines whether the next case $C_{i+1}$ is present in operation 602.

When the next case $C_{i+1}$ is determined to be absent in operation 602, the SPARK applies a REDUCE function to the event transitions K in operation 606.

In operation 606, the SPARK executes the REDUCE function after completing the MAP function, and collects data of all the event transitions K from the system.

In operation 607, the SPARK sorts the event transitions K by a start time by applying a SORT function. A result value may be formed as a sequence of the event transitions K, and a list of data of the event transitions K may be sorted by the start time.

In operation 608, the SPARK initializes a list of partitions P. In operation 609, the SPARK determines whether a next partition $P_{i+1}$ is present in operation 609.

The SPARK repeatedly initializes the list of the partitions P, together with a number of empty slots limited per partition I.

When the next partition $P_{i+1}$ is determined to be present in operation 609, the SPARK initializes a partition $P_i$ in operation 610, and determines whether an empty slot is present in operation 611.

When the empty slot is determined to be present in operation 611, the SPARK inputs the event transitions K to the empty slot in operation 612, and redetermines whether an empty slot is present in operation 611.

Because each partition includes an empty slot, the SPARK repeatedly inputs attributes of the event transitions K to an empty slot in operations 611 and 612.

When the empty slot is determined to be absent in operation 611, the SPARK sets an attribute value of the partition $P_i$ and stores data of the partition $P_i$ in the HDFS in operations 613 and 614.

Before the above operations are repeated with respect to the next partition $P_{i+1}$, the SPARK may need to set the attribute value of the partition $P_i$ and store the data of the partition $P_i$ in the HDFS.

When the next partition $P_{i+1}$ is determined to be absent in operation 609, the SPARK sets an attribute value of partition summary information Ps and stores data of the partition summary information Ps in the HDFS in operations 615 and 616.

When processing of an event transition in a last partition is completed, the SPARK may set the attribute value of the partition summary information Ps and stores the data of the partition summary information Ps in the HDFS.

Figure 7:
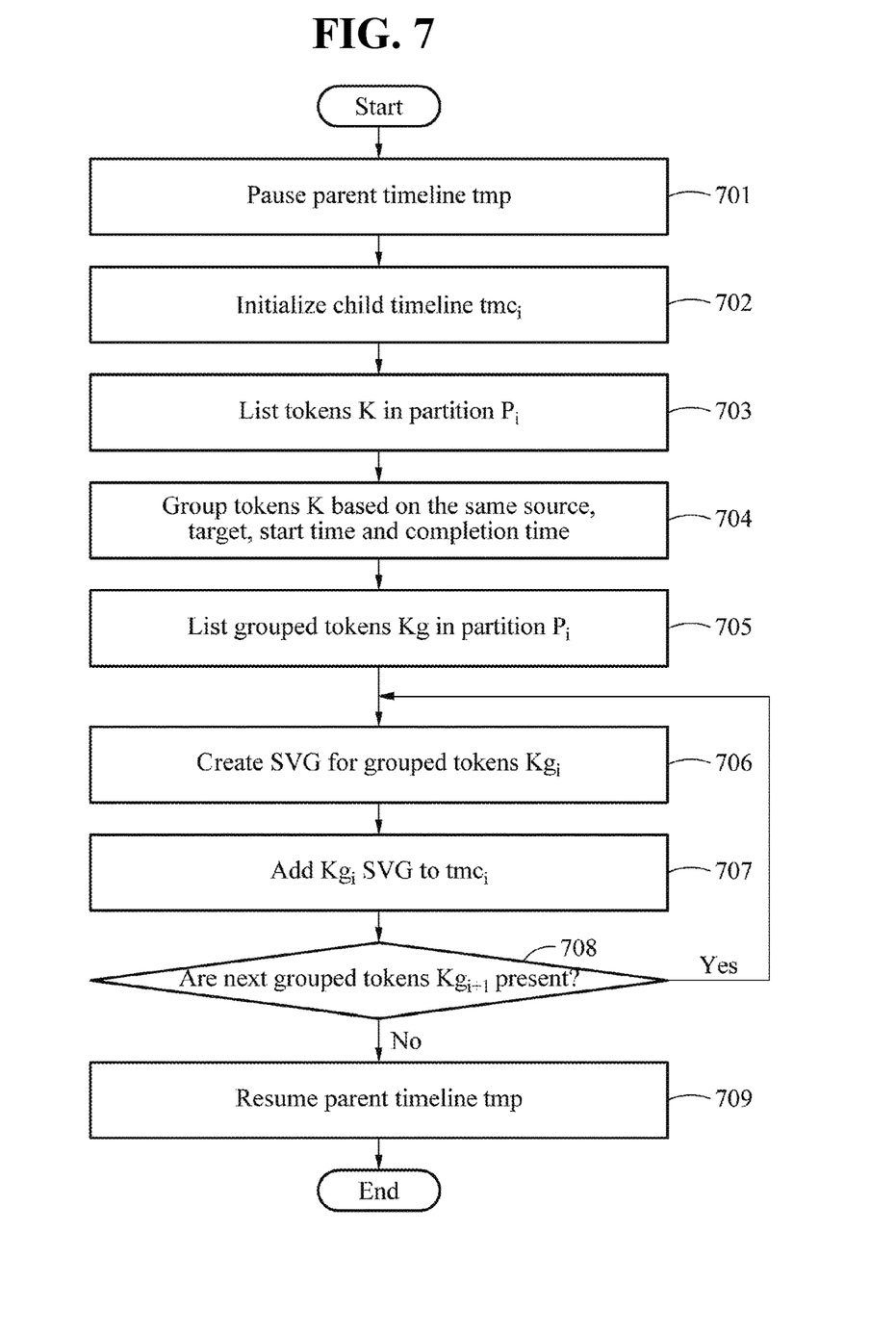
FIG. 7 is a flowchart illustrating, in detail, an example of operation 524 of FIG. 5B.

FIG. 7 is a flowchart illustrating, in detail, an example of operation 524 of FIG. 5B.

FIG. 7 illustrates a process of initializing an animation for a token in a partition $P_i$ in a web browser.

Referring to FIG. 7, in operations 701 and 702, the web browser pauses a parent timeline tmp, and initializes a child timeline $tmc_i$ for handling of an animation for the partition $P_i$.

In operations 703 and 704, the web browser lists tokens K in the partition $P_i$, and groups the tokens K based on the same source, a target, a start time and a completion time.

In operations 705 through 707, the web browser lists grouped tokens Kg in the partition $P_i$, creates a scalable vector graphics (SVG) for the grouped tokens Kg, and adds a created $Kg_i$ SVG to the child timeline $tmc_i$.

The SVG may be an extensible markup language (XML)-based vector image format for two-dimensional (2D) graphics to support an interactivity and an animation, and may be dynamic and interactive as an open standard developed by a World Wide Web Consortium (W3C).

In operation 708, the web browser determines whether next grouped tokens $Kg_{i+1}$ are present. When the next grouped tokens $Kg_{i+1}$ are determined to be present, the web browser creates an SVG for the next grouped tokens $Kg_{i+1}$ in operation 706.

When the next grouped tokens $Kg_{i+1}$ are determined to be absent, the web browser resumes the parent timeline tmp in operation 709.

FIG. 8 is a diagram illustrating an example of visualizing a log replay page in a large event log replay system according to an example embodiment.

Referring to FIG. 8, when an access command for a log replay page is generated, the large event log replay system may divide a log file corresponding to a process included in the access command into a set size, and may generate a plurality of split log files.

The large event log replay system may sequentially acquire the plurality of split log files from a storage system (for example, an HDFS), and may implement the log replay page in a manager terminal through rendering of a predetermined number of event logs included in each of the plurality of split log files as shown in FIG. 8.

Referring to FIG. 8, the large event log replay system may display, as nodes, activities QW, PP, RC, SP, AN, PR, RW and WS included in an event log, may connect the nodes by an arc, may express a flow of a process using a circle moving between the nodes along the arc, and may show a quantity of the flow of the process based on a size of the circle, to visualize the log replay page in the manager terminal.

Hereinafter, a flow of a task of the large event log replay system 200 is further described with reference to FIG. 9.

Figure 9:
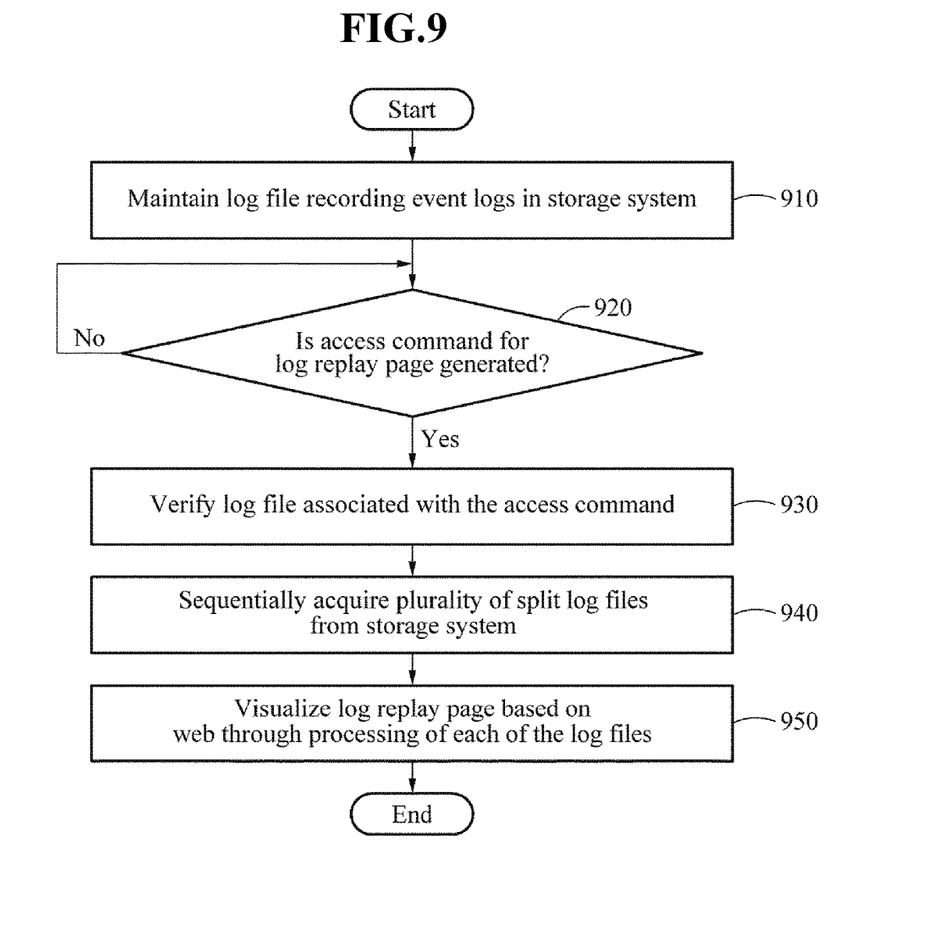
FIG. 9 is a flowchart illustrating a large event log replay method according to an example embodiment.

FIG. 9 is a flowchart illustrating a large event log replay method according to an example embodiment.

The large event log replay method of FIG. 9 may be performed by the above-described large event log replay system 200.

Referring to FIG. 9, in operation 910, the large event log replay system 200 counts event logs generated in a process before a next process performed subsequent to the process, and may maintain a log file that records the event logs in a storage system.

The large event log replay system 200 may record event logs that are generated for various task actions during a process execution by a partition processing platform (for example, a SPARK), as a log file in an order that the event logs are generated, and may distribute and store the log file in a storage system (for example, an HDFS) configured to distribute and process a large quantity of data, to further facilitate processing of large event logs during a log replay.

In operation 920, the large event log replay system 200 determines whether an access command for a log replay page is generated in a manager terminal.

When the access command is determined to be generated in operation 920, the large event log replay system 200 verifies a log file corresponding to a process included in the access command from the storage system in operation 930.

In operation 940, the large event log replay system 200 generates a plurality of split log files by dividing the verified log file into a set size (partitions), and acquires the plurality of split log files from the storage system (for example, an HDFS).

For example, the large event log replay system 200 may transmit a division command to the storage system, so that the storage system may generate the plurality of split log files by dividing the log file into partitions based on the division command.

The large event log replay system 200 may determine a size of a split log file based on a type of the process or a capacity of the log file, and may adjust an acquisition interval of each of the split log files from the storage system in proportion to the determined size.

The large event log replay system 200 may sequentially acquire the plurality of split log files from an HDFS. For example, when a predetermined number of event logs included in a first split log file among the plurality of split log files are being processed, the large event log replay system 200 may acquire a second split log file that is located next to the first split log file in the log file from the storage system.

In operation 950, the large event log replay system 200 visualizes the log replay page based on a web, through processing of each of the split log files.

For example, the large event log replay system 200 may process the plurality of split log files using a REST API-based web application (web browser), and may visualize a log replay page representing an event occurrence degree for each process.

Depending on example embodiments, when it is determined that a log file associated with the access command is not maintained in the storage system (for example, an HDFS), the large event log replay system 200 may wait for a generation of an event log in response to a process execution in a partition processing platform (for example, a SPARK).

For example, when a log file associated with the access command is not maintained in the storage system, and when a log file that records an event log generated in response to processing of a process in the partition processing platform is maintained in the storage system, the large event log replay system 200 may acquire the generated log file from the storage system.

Referring to FIG. 6, when a list of cases including a sequence of event logs is input, the partition processing platform (SPARK) may map all event logs in the cases to event transitions using a MAP function, may apply a REDUCE function to the event transitions, may sort the event transitions using a SORT function based on points in time at which the event transitions are generated, may initialize a partition, may insert a predetermined number (for example, "5,000") of event transitions into each of the partitions using an INSERT function, may maintain each of the partitions in the storage system, and may maintain summary information of each of the partitions in the storage system.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A large event log replay method comprising:
   maintaining a log file including event logs in a non-transitory storage medium, the event logs being generated in a process before a next process performed subsequent to the process;
   verifying the log file corresponding to the process included in an access command for a log replay page from the non-transitory storage medium, in response to the access command being generated, the log replay page representing a degree of a generation of event logs during the process;
   predicting a remaining processing time for a log replay process of the generated log for each of cases associated with a sequence of the event logs based on at least one of a frequency and an event occurrence time verified from a timestamp included in each of the event logs;
   selecting a first case in which the remaining processing time is predicted to be greater than a reference time interval, and deriving a node associated with the first case as a bottleneck point of the process;
   dividing all the event logs included in the log file based on the first case, and generating a plurality of split log files;
   acquiring the plurality of split log files from the non-transitory storage medium; and
   sequentially rendering event logs included in each of the plurality of split log files, visualizing the log replay page and preventing the bottleneck point from being displayed on the log replay page.

2. The large event log replay method of claim 1, further comprising:
   dividing all event logs included in the log file by "n" and generating the plurality of split log files, "n" being a natural number greater than or equal to "2"; and
   rendering a predetermined number of event logs included in each of the plurality of generated split log files and implementing the log replay page.

3. The large event log replay method of claim 1, further comprising:
   sequentially dividing all event logs included in the log file by a selected number and generating the plurality of split log files; and
   rendering event logs included in each of the plurality of split log files at a point in time at which each of the plurality of split log files is generated, and implementing the log replay page, through a web application.

4. The large event log replay method of claim 1, further comprising:
   associating the log file with partition summary information including a partition attribute value set for each of the plurality of split log files and maintaining the log file in the non-transitory storage medium, in conjunction with the generating of the plurality of split log files; and
   reading, from the partition summary information, a partition attribute value including at least one of a number of event logs included in a partition, a sort order of partitions and a number of empty slots limited per partition, processing each of the plurality of split log files, and implementing the log replay page.

5. The large event log replay method of claim 1, further comprising:
   displaying activities included in the event logs as nodes; and
   visualizing a processing flow of the process and the degree of the generation of the event logs during the process, based on a size of a figure that moves along an arc connecting the nodes, and implementing the log replay page.

6. The large event log replay method of claim 1, further comprising:
   determining a size of a split log file based on a type of the process or a capacity of the log file; and
   adjusting an acquisition interval of each of the split log files from the non-transitory storage medium in proportion to the determined size.

7. The large event log replay method of claim 1, further comprising:
   transmitting a division command to the non-transitory storage medium; and
   generating the plurality of split log files by dividing the log file into partitions in the non-transitory storage medium based on the division command.

8. The large event log replay method of claim 7, wherein the generating of the plurality of split log files comprises dividing the log file based on at least one of a number of event logs per partition and a number of partitions, the number of event logs and the number of partitions being designated by the division command.

9. The large event log replay method of claim 1, further comprising:
   transmitting a division command to the non-transitory storage medium; and
   acquiring a specific split log file identified by a token included in the division command from the non-transitory storage medium.

10. The large event log replay method of claim 1, wherein the generating of plurality of split log files comprises sequentially acquiring the plurality of split log files based on an order in which the plurality of split log files are located in the log file.

11. The large event log replay method of claim 1, wherein the event logs are recorded in the log file in correspondence to points in time at which the event logs are generated, and
   the generating of plurality of split log files comprises, when a predetermined number of event logs included in a first split log file among the plurality of split log files are being processed, acquiring a second split log file that is located next to the first split log file in the log file from the non-transitory storage medium.

12. The large event log replay method of claim 1, further comprising:
when a log file associated with the access command is not maintained in the non-transitory storage medium, waiting for a generation of an event log in response to a process execution in a partition processing platform.

13. The large event log replay method of claim 1, further comprising, when a visualization command for the log replay page is generated before all the plurality of generated split log files are acquired:
visualizing the log replay page using a portion of the split log files that are acquired from the non-transitory storage medium before the visualization command is generated; and
updating the log replay page by generating the visualization command again at a point in time at which the remaining split log files are acquired from the non-transitory storage medium.

14. A large event log replay system comprising:
a recorder which maintains a log file including event logs in a non-transitory storage medium, the event logs being generated in a process before a next process performed subsequent to the process;
a verifier which verifies a log file corresponding to a process included in an access command for a log replay page from the non-transitory storage medium, in response to the access command being generated, the log replay page representing a degree of a generation of event logs during the process; and
an acquirer which:
predicts a remaining processing time for a log replay process of the generated log for each of cases associated with a sequence of the event logs based on at least one of a frequency and an event occurrence time verified from a timestamp included in each of the event logs;
selects a first case in which the remaining processing time is predicted to be greater than a reference time interval, and derive a node associated with the first case as a bottleneck point of the process;
divides all the event logs included in the log file based on the first case, configured to generate a plurality of split log files;
acquires the plurality of split log files from the non-transitory storage medium; and
sequentially renders event logs included in each of the plurality of split log files, visualizes the log replay page and prevents the bottleneck point from being displayed on the log replay page.

15. The large event log replay system of claim 14, further comprising:
an implementer configured to implement a log replay page representing an event occurrence degree for each process, by rendering a predetermined number of event logs included in each of the plurality of split log files.

16. The large event log replay system of claim 14, wherein the acquirer is configured to determine a size of a split log file based on a type of the process or a capacity of the log file, and to adjust an acquisition interval of each of the split log files from the non-transitory storage medium in proportion to the determined size.

17. The large event log replay system of claim 14, wherein the acquirer is configured to transmit a division command to the non-transitory storage medium, and the non-transitory storage medium is configured to generate the plurality of split log files by dividing the log file into partitions based on the division command.

18. The large event log replay system of claim 14, wherein
the event logs are recorded in the log file in correspondence to points in time at which the event logs are generated, and
when a predetermined number of event logs included in a first split log file among the plurality of split log files are being processed, the acquirer is configured to acquire a second split log file that is located next to the first split log file in the log file from the non-transitory storage medium.

* * * * *